H. H. Gridley,
Head Block.

No. 106,932. Patented Aug. 30, 1870.

Witnesses  
David Right  
Fred L. Manning

Inventor.  
Henry H. Gridley

UNITED STATES PATENT OFFICE.

HENRY H. GRIDLEY, OF AUBURN, NEW YORK.

IMPROVEMENT IN HEAD-BLOCK.

Specification forming part of Letters Patent No. 106,932, dated August 30, 1870.

Figure 1:
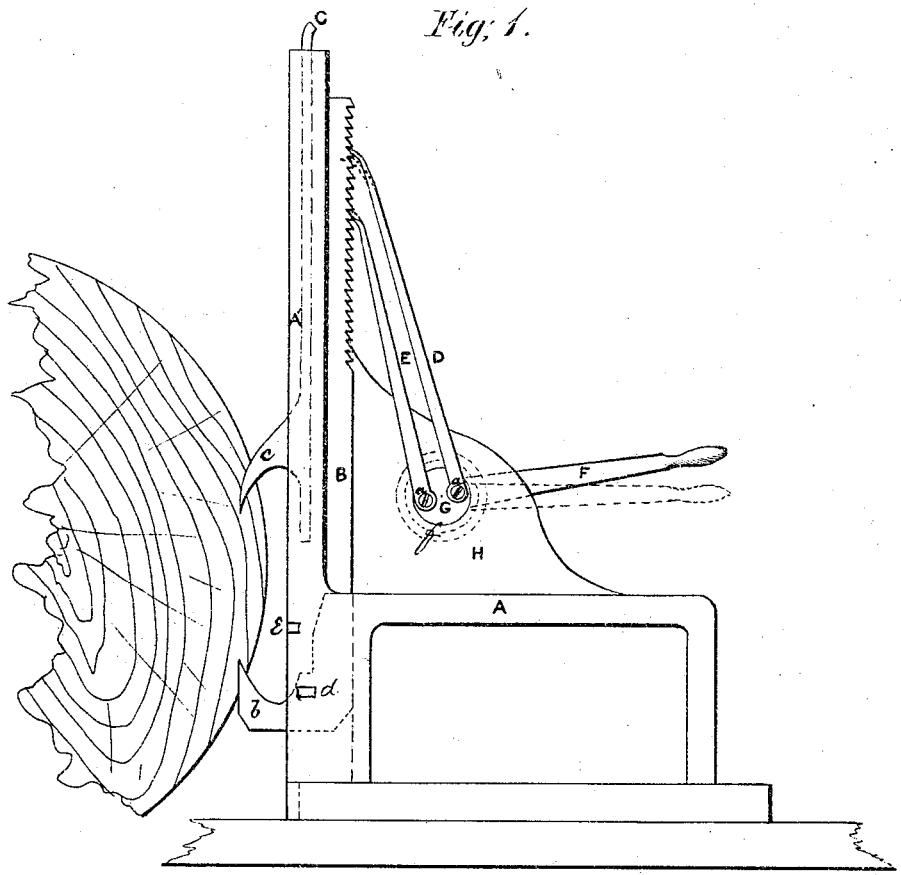
Figure 2:
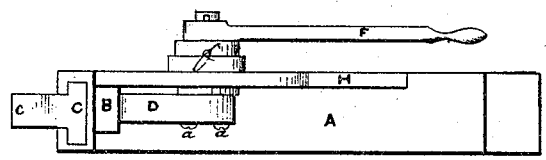

I, HENRY H. GRIDLEY, of the city of Auburn, in the county of Cayuga and State of New York, have invented certain new and useful Improvements in Saw-Mills, of which the following is a specification:

Figure 1 represents a side view of my invention and of the head-block and a section of the saw-log. Fig. 2 represents a top view of the same.

The nature of my invention consists, first, in passing the upper part of the dog, the tooth of which takes into the lower part of the log, through the upright part of the head-block, as is hereinafter more particularly described; second, in constructing and so arranging a new lifting apparatus as to cause the tooth of the dog, which takes into the lower part of the log, to enter the log and to remain firmly therein, and by which, also, the log, when desired, may be lifted and firmly held above and free from the frame or carriage.

Similar letters of reference, where they occur in the separate figures, denote like parts in both the drawings.

To enable others skilled in the art to make and use my invention, I will proceed to describe the same with reference to the drawings.

A and A′ represent portions of the frame of the head-block, A′ being the upright part thereof. B represents the shaft of the lower dog. C represents the shaft of the upper dog. D and E represent the pawls which take into the ratchet-teeth in the back of the lower dog. F represents the lever used to raise the pawls D and E. G represents an axle, upon one end of which the lever F is attached, and to the other end whereof the pawls D and E are attached. H represents a metal plate, cast solid with the frame of the head-block to support the lifting apparatus. $a\ a$ represent the screw-bolts upon which the pawls D and E move, and which enter into said axle G. $b$ represents the tooth of the lower dog, which takes into the under side of the log. $c$ represents the tooth of the upper dog, which takes into the upper side of the log. $d$ represents the spur upon the lower part of the lower dog. $e$ represents the notch cut in the side or corner of the upright part of the head-block A′. $f$ represents the hub through which the axle G passes.

The upright part of the head-block A′ is made with a groove therein, extending downward from the top thereof until it reaches very nearly to the base thereof, with a recess in each side thereof, so as to form a rabbet in which the dogs slide. This groove is deepened as it nears the bottom or base of the head-block, so that the lower dog may move therein. An aperture is made through this upper part of the head-block A′, through which the upper part of the lower dog, B, is passed. Upon one side of this lower dog a spur, $d$, is affixed, which slides in one side of the rabbet above described, so as to prevent the lower dog from falling out of the groove.

A notch, $e$, is cut through the edge of the upright part of the head-block A′ into one of the grooves of the rabbet above described, through which the spur $d$ passes, to allow the lower end of the dog to be let into and taken out of the groove whenever necessary so to do. Upon the outer side of this lower dog, B, commencing at the top and continuing downward for about nine inches, teeth are cut, between which the pawls E and D engage. The upper dog, C, should be made of good tough wrought-iron, or other strong metal, with a tooth thereon projecting outward and downward to the extent of about two and a quarter inches from the face of the head-block to the point of the tooth. The lower dog, B, should also be made of good tough wrought-iron, or other strong metal, with a tooth, $b$, thereon, extending outward and upward from the base thereof, the point thereof being also about two and a quarter inches from the face of the upright part of the head-block A′. Near the base of this lower dog, B, and upon the side thereof, a spur is fixed, which slides in one side of the said rabbet, so as to prevent this dog from leaving the groove when drawn forward. A notch, $e$, is cut into one of the grooves of the said rabbet, to allow the spur $d$ to pass into and out of said groove of said rabbet, so that the lower dog, B, may be entered into and taken out of said groove in the upright part of said head-block A′ at pleasure.

A plate, H, is made, extending rearward from the upright part of the head-block A′, and connected therewith, for the support of the lifting apparatus E D F G. Upon this plate a hub, *f*, is formed, through which the axle G passes. Upon one end of the axle G the pawls E and D are attached by screw-bolts *a a*, and upon the other end thereof a lever, F, is attached by a screw-bolt. The lever F should be about fifteen inches in length.

Two pawls, E and D, are attached to one end of the axle G, each equidistant from the center thereof, the one ten and the other thirteen inches in length, the upper or unattached ends whereof take into the spaces between the teeth cut upon the dog B to receive the same.

Having thus fully described my improvement and the several constituent parts thereof, I will now describe the practical operation thereof.

The head-block having been affixed to the carriage, in its proper place and position, the dog B is placed therein, the base thereof resting upon the bottom of the groove in said head-block. The log is then rolled upon the carriage until it reaches the head-block. The upper dog, C, is then inserted in the head-block, and suffered to fall therein until the point of the tooth thereof shall reach the log, and then, by blows upon the top, it is driven into the log sufficiently far to hold the same firmly.

The lever F is then moved up and down, the upper ends of the pawls E and D being first properly placed so as to engage in the spaces between the teeth upon the dog B, and at every movement of the lever the dog B is lifted and the tooth thereof forced into the under part of the log. This lifting motion is continued until the tooth has entered the log sufficiently so as to hold it firmly. The log is then ready for the saw.

Should it be desirable at any time to have a board or slab left less in thickness than will be allowed with the dog pressing against the head-block, the log may, in such case, be dogged so as to leave a space between it and the face of the head-block, as it has been found in practice that these dogs are sufficient to hold the log firmly in place, even should it not come in contact with the head-block.

It has also been found in practice that the lower dog will hold up a log of ordinary size free from the carriage while being sawed, which, in case of rough or crooked logs, has been found to be a great convenience.

When the log shall be finished, and the materials made therefrom removed, the upper dog should be taken out of the head-block and the lower dog be let down, as before described, and all is in readiness to receive another log.

Having thus fully described my invention and the operation thereof, what I claim as new, and desire to secure by Letters Patent, is—

1. Passing the shaft B of the lower dog longitudinally through the upright portion A' of the head-block, substantially as and for the purpose described.

2. The lifting apparatus E D F, substantially as and for the purpose described.

HENRY H. GRIDLEY.

Witnesses:
 DAVID WRIGHT,
 FRED. L. MANNING.